US012803885B2

(12) United States Patent
Kedalagudde et al.

(10) Patent No.: US 12,803,885 B2
(45) Date of Patent: Nov. 17, 2026

(54) ML MODEL SHARING BETWEEN NWDAFS

(71) Applicant: Intel Corporation, Santa Clara, CA (US)

(72) Inventors: Meghashree Dattatri Kedalagudde, Portland, OR (US); Abhijeet Kolekar, Portland, OR (US); Yi Zhang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 19/130,890

(22) PCT Filed: Nov. 24, 2023

(86) PCT No.: PCT/US2023/081030
§ 371 (c)(1),
(2) Date: May 16, 2025

(87) PCT Pub. No.: WO2024/137101
PCT Pub. Date: Jun. 27, 2024

(65) Prior Publication Data

US 2026/0197246 A1 Jul. 9, 2026

Related U.S. Application Data

(60) Provisional application No. 63/433,636, filed on Dec. 19, 2022.

(51) Int. Cl.

*H04L 41/16* (2022.01)
*G06N 3/08* (2023.01)

(Continued)

(52) U.S. Cl.

CPC ............... *H04L 41/16* (2013.01); *G06N 3/08* (2013.01); *H04L 41/142* (2013.01); *H04L 41/342* (2022.05)

(58) Field of Classification Search

CPC ..... H04L 41/16; H04L 41/342; H04L 41/142; G06N 3/08

See application file for complete search history.

(56) References Cited

U.S. PATENT DOCUMENTS

2020/0196155 A1 6/2020 Bogineni et al.
2022/0108214 A1* 4/2022 Lee ....................... H04W 48/18

(Continued)

FOREIGN PATENT DOCUMENTS

CN 114339821 A 4/2022
WO 2022069063 A1 4/2022

OTHER PUBLICATIONS

International Searching Authority, Transmittal of International Search Report and Written Opinion, mailed on Mar. 22, 2024 for Application No. PCT/US2023/081030, 7 pages.

(Continued)

*Primary Examiner* — Minh Chau Nguyen
(74) *Attorney, Agent, or Firm* — Schwabe, Williamson & Wyatt, P.C.

(57) ABSTRACT

The application relates to Machine Learning (ML) model sharing between Network Data Analytics Functions (NWDAFs) in a wireless communication system. An apparatus used in a NWDAF entity containing Model Training Logical Function (MTLF), wherein the apparatus includes processor circuitry configured to cause the NWDAF entity containing MTLF to: receive, from another NWDAF entity containing Analytics Logical Function (AnLF) or MTLF, an ML model provision request, which comprises an access token to the NWDAF entity containing MTLF and an analytics identifier or a Machine Learning (ML) model identifier associated with an ML model file; and send, to the another NWDAF entity containing AnLF or MTLF, an ML model provision response, which comprises the analytics identifier or the ML model identifier associated with the ML (Continued)

model file and a container containing the ML model file or a network address associated with the ML model file.

19 Claims, 9 Drawing Sheets

(51) Int. Cl.
*H04L 41/142* (2022.01)
*H04L 41/342* (2022.01)

(56) References Cited

U.S. PATENT DOCUMENTS

| | | | | |
|---|---|---|---|---|
| 2022/0337487 | A1* | 10/2022 | Wei | H04L 41/12 |
| 2022/0377844 | A1 | 11/2022 | Kumar et al. | |
| 2025/0119715 | A1* | 4/2025 | Yue | H04L 41/16 |
| 2025/0365212 | A1* | 11/2025 | Kunz | H04W 12/041 |
| 2026/0046614 | A1* | 2/2026 | Kunz | H04L 41/16 |

OTHER PUBLICATIONS

3GPP; TSG SA; Architecture enhancements for 5GS to support network data analytics services (Release 17), 3GPP TS 23.288 V17.6.0. Sep. 22, 2022, 210 pages.

* cited by examiner

ML MODEL SHARING BETWEEN NWDAFS

CROSS REFERENCE TO RELATED APPLICATION

The present application is a national phase entry under 35 U.S.C. § 371 of International Application No. PCT/US2023/081030, filed Nov. 24, 2023, entitled "ML MODEL SHARING BETWEEN NWDAFS," which claims priority to U.S. Provisional Patent Application No. 63/433,636, which was filed Dec. 19, 2022, the entire disclosures of which are hereby incorporated by reference.

TECHNICAL FIELD

Embodiments of the disclosure generally relate to wireless communications, and in particular to Machine Learning (ML) model sharing between Network Data Analytics Functions (NWDAFs) in a wireless communication system.

BACKGROUND ART

Mobile communication has evolved significantly from early voice systems to today's highly sophisticated integrated communication platform. The 5G or New Radio (NR) wireless communication system will provide access to information and sharing of data anywhere, anytime by various users and applications.

BRIEF DESCRIPTION OF THE DRAWINGS

Embodiments of the disclosure will be illustrated, by way of example and not limitation, in the accompanying drawings in which like reference numerals refer to similar elements.

DETAILED DESCRIPTION OF EMBODIMENTS

Various aspects of the illustrative embodiments will be described using terms commonly employed by those skilled in the art to convey the substance of the disclosure to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrases "in an embodiment" "in one embodiment" and "in some embodiments" are used repeatedly herein. The phrase generally does not refer to the same embodiment; however, it may. The terms "comprising," "having," and "including" are synonymous, unless the context dictates otherwise. The phrases "A or B" and "A/B" mean "(A), (B), or (A and B)."

It is important to ensure security of Artificial Intelligence (AI) or Machine Learning (ML) models when they are shared among different entities, such as NWDAF entities and Network Function (NF) entities in a wireless communication system. This is because the AI or ML models and their algorithms are generally proprietary and subject to intellectual property rights. To protect the AI or ML models, it is necessary to implement an authorization scheme that ensures only authorized entities can access the AI or ML models. This can be done by requiring that only a NF producer entity of an AI or ML model can store the AI or ML model in an Analytics Data Repository Function (ADRF) entity, a NWDAF entity, or other entities. Additionally, the ADRF or other storage entities must be able to verify that a NF consumer entity is authorized to retrieve the AI or ML model. Furthermore, protecting the AI or ML models while they are at rest in the ADRF or other storage entities is important. This can be done by implementing encryption and other security measures to prevent unauthorized access to the AI or ML models. In summary, to ensure the security of AI or ML model storage and sharing, it is necessary to implement an authorization scheme that ensures only authorized entities have access to the AI or ML models and/or to protect the AI or ML models while they are at rest in the storage entity.

Figure 1:
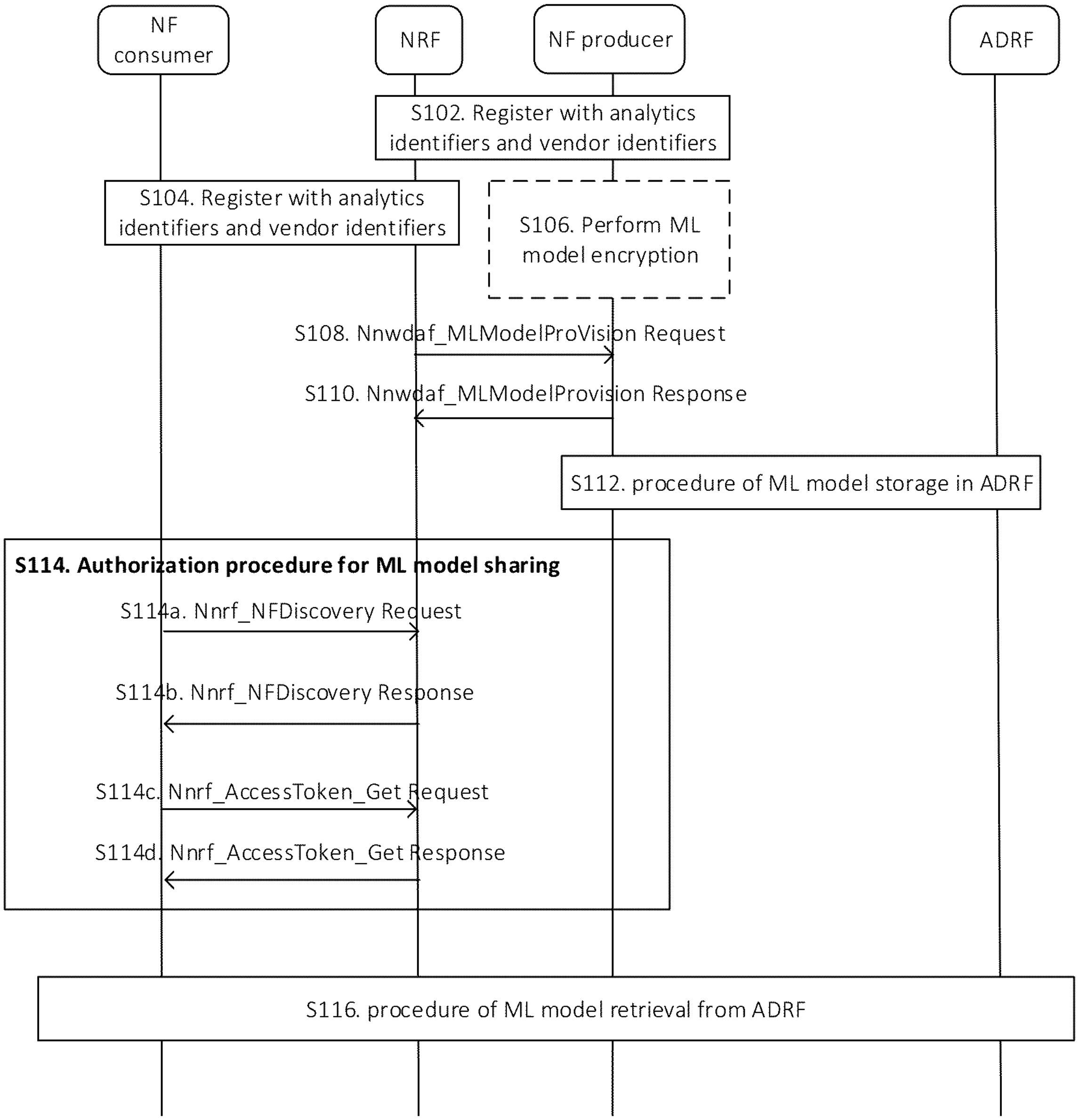
FIG. 1 illustrates a sequence diagram of a procedure of ML model sharing between a NF producer entity and a NF consumer entity in a wireless communication system in accordance with some embodiments of the disclosure.

FIG. 1 illustrates a sequence diagram of a procedure of ML model sharing between a NF producer entity and a NF consumer entity in a wireless communication system in accordance with some embodiments of the disclosure. As shown in FIG. 1, the procedure of ML model sharing between the NF producer entity and the NF consumer entity includes:

S102, the NF producer entity registers its network function profile in a Network Repository Function (NRF) entity, wherein the network function profile of the NF producer entity includes analytics identifiers associated with ML model files produced by the NF producer entity and vendor identifiers allowed to access the ML model files based on the analytics identifiers.

S104, the NF consumer entity registers its network function profile in the NRF entity, wherein the network function profile of the NF consumer entity includes analytics identifiers associated with ML model files supported for the NF consumer entity and a vendor identifier associated with the NF consumer entity.

S106, the NF producer entity encrypts the ML model files produced by itself. This is an optional step.

S108, the NRF entity sends an Nnwdaf_MLModelProvision request to the NF producer entity, wherein the Nnwdaf_MLModelProvision request includes an access token to the NF producer entity, an analytics identifier associated with an ML model file, ML model filter information, and a vendor identifier associated with the NRF entity.

S110, the NF producer entity verifies the access token included in the Nnwdaf_MLModelProvision request, determines the ML model file to be shared based on the analytics identifier and the ML model filter information included in the Nnwdaf_MLModelProvision request, and sends an Nnwdaf_MLModelProvision response to the NRF entity, wherein the Nnwdaf_MLModelProvision response includes the analytics identifier associated with the ML model file and a network address associated with the ML model file (for example, an Uniform Resource Locator (URL) of the ML model file).

S112, a procedure of ML model storage is implemented between the NF producer entity and an ADRF entity.

S114, an authorization procedure for ML model sharing between the NF consumer entity and the NF producer entity is implemented. For example, the authorization procedure includes: S114*a*, the NF consumer entity sends an Nnrf_NFDiscovery request, which includes the analytics identifier associated with the ML model file and the vendor identifier associated with the NF consumer entity, to the NRF entity; S114*b*, the NRF entity sends an Nnrf_NFDiscovery response, which includes the analytics identifier or an ML model identifier associated with the ML model file and information associated with the NF producer entity, to the NF consumer entity; S114*c*, the NF consumer entity sends an Nnrf_AccessToken_Get request, which includes the analytics identifier or the ML model identifier associated with the ML model file, the vendor identifier associated with the NF consumer entity, and the information associated with the NF producer entity, to the NRF entity; and S114*d*, the NRF entity sends an Nnrf_AccessToken_Get response, which includes the analytics identifier or the ML model identifier associated with the ML model file and an access token to the NF producer entity, to the NF consumer entity.

S116, a procedure of ML model retrieval is implemented among the NF consumer entity, the NF producer entity, and the ADRF entity. In the case that the NF producer encrypts the ML model files produced by itself, the NF producer entity may send an encryption key used to encrypt the ML model file using a public key of the NF consumer entity, and the NF consumer entity may use the encryption key received from the NF producer entity to decrypt the ML model file received from the NF producer entity.

In the procedure shown in FIG. 1, the NF consumer entity may be a NWDAF entity containing Model Training Logical Function (MTLF) or Analytics Logical Function (AnLF), and the NF producer entity may be another NWDAF entity containing MTLF.

Figure 2:
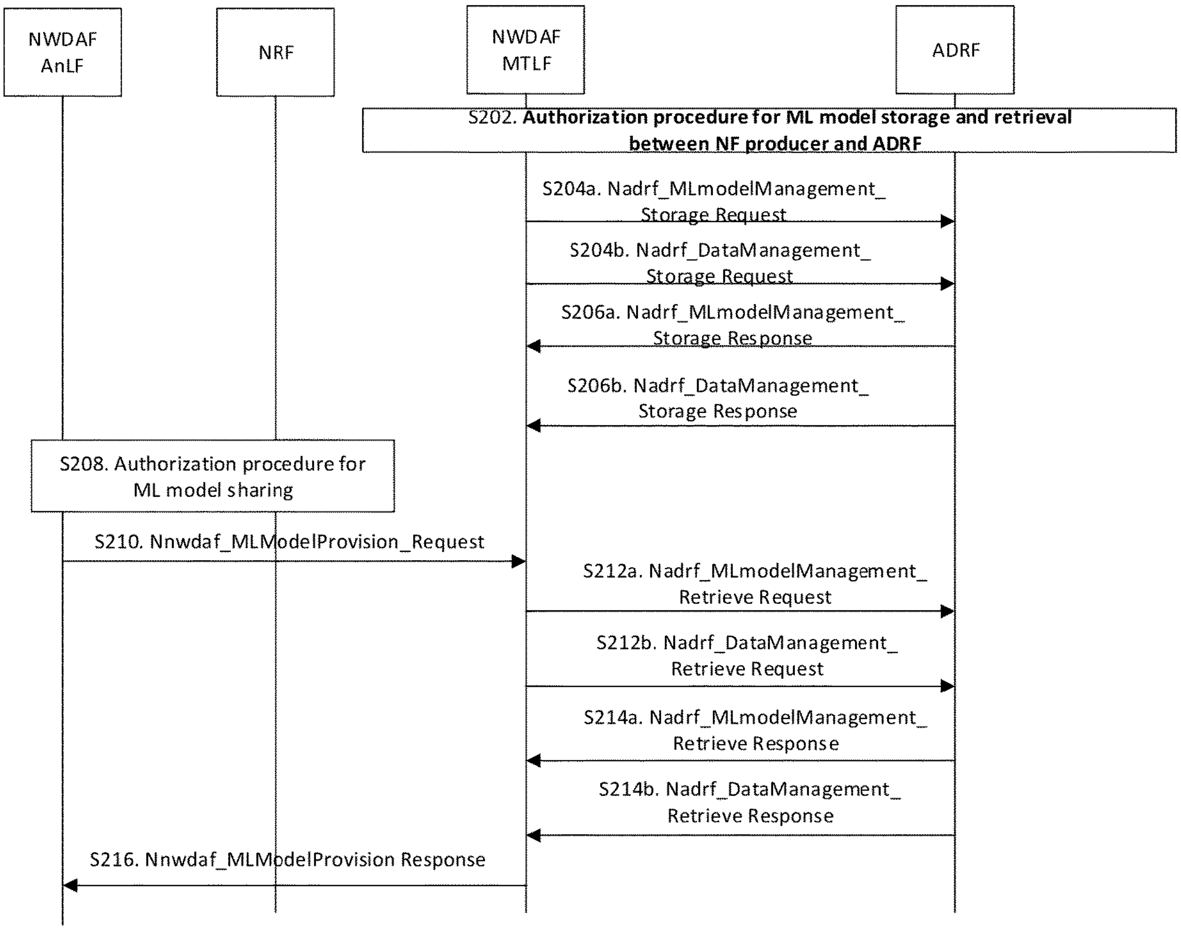
FIG. 2 illustrates a sequence diagram of an ML model storage and retrieval procedure in accordance with some embodiments of the disclosure.

FIG. 2 illustrates a sequence diagram of an ML model storage and retrieval procedure in accordance with some embodiments of the disclosure. As shown in FIG. 2, in some embodiments, when the NF consumer entity is a NWDAF entity containing AnLF and the NF producer entity is a NWDAF entity containing MTLF, the ML model storage and retrieval procedure includes:

S202, an authorization procedure for ML model storage and retrieval is implemented between the NWDAF entity containing MTLF and the ADRF entity.

S204*a*, the NWDAF entity containing MTLF sends a Nadrf_MLmodelManagement_Storage request, which includes an access token to the ADRF entity, the analytics identifier or the ML model identifier associated with the ML model file, and a container containing the ML model file or the network address associated with the ML model file, to the ADRF entity.

S206*a*, the ADRF entity sends a Nadrf_MLmodelManagement_Storage response, which includes a result indication for indicating storage status of the ML model file and a storage transaction identifier for identifying a pointer to the ML model file stored in the ADRF entity, to the NWDAF entity containing MTLF.

S208, an authorization procedure for ML model sharing between the NWDAF entity containing MTLF and the NWDAF entity containing AnLF is implemented. Details of this step are similar as those described for S114 in FIG. 1, and they are not described repeatedly.

S210, the NWDAF entity containing AnLF sends an Nnwdaf_MLModelProvision request, which includes the access token to the NWDAF entity containing MTLF and the analytics identifier or the ML model identifier associated with the ML model file, to the NWDAF entity containing MTLF.

S212*a*, the NWDAF entity containing MTLF entity sends a Nadrf_MLmodelManagement_Retrieve request, which includes the access token to the ADRF entity, the ML model identifier associated with the ML model file, and the storage transaction identifier for identifying the pointer to the ML model file stored in the ADRF entity, to the ADRF entity.

S214*a*, the ADRF entity sends a Nadrf_MLmodelManagement_Retrieve response, which includes the ML model identifier associated with the ML model file, the result indication for indicating storage status of the ML model file in the ADRF entity, and the container containing the ML model file or the network address associated with the ML model file, to the NWDAF entity containing MTLF.

S216, the NWDAF entity containing MTLF sends an Nnwdaf_MLModelProvision response, which includes the analytics identifier or the ML model identifier associated with the ML model file and the container containing the ML model file or the network address associated with the ML model file, to the NWDAF entity containing AnLF.

It should be appreciated that S204*b* and S206*b* may be implemented instead of S204*a* and S206*a*. Specifically, the NWDAF entity containing MTLF may send a Nadrf_DataManagement_Storage request, which includes the access token to the ADRF entity, the analytics identifier associated with the ML model file, and a dataset tag identifying ML model type data, to the ADRF entity in S204*b*, and the ADRF entity may send a Nadrf_DataManagement_Storage response, which includes the result indication for indicating storage status of the ML model file in the ADRF entity and the container containing the ML model file or the network address associated with the ML model file, to the NWDAF entity containing MTLF in S206*b*.

It should also be appreciated that S212*b* and S214*b* may be implemented instead of S212*a* and S214*a*. Specifically, the NWDAF entity containing MTLF may send a Nadrf_DataManagement_Retrieve request, which includes the access token to the ADRF entity, the storage transaction identifier for identifying the pointer to the ML model file stored in the ADRF entity, and the dataset tag identifying ML model type data, to the ADRF entity in S212*b*, and the ADRF entity may send a Nadrf_DataManagement_Retrieve response, which includes the result indication for indicating storage status of the ML model file in the ADRF entity and the container containing the ML model file or the network address associated with the ML model file, to the NWDAF entity containing MTLF in S214*b*.

Figure 3:
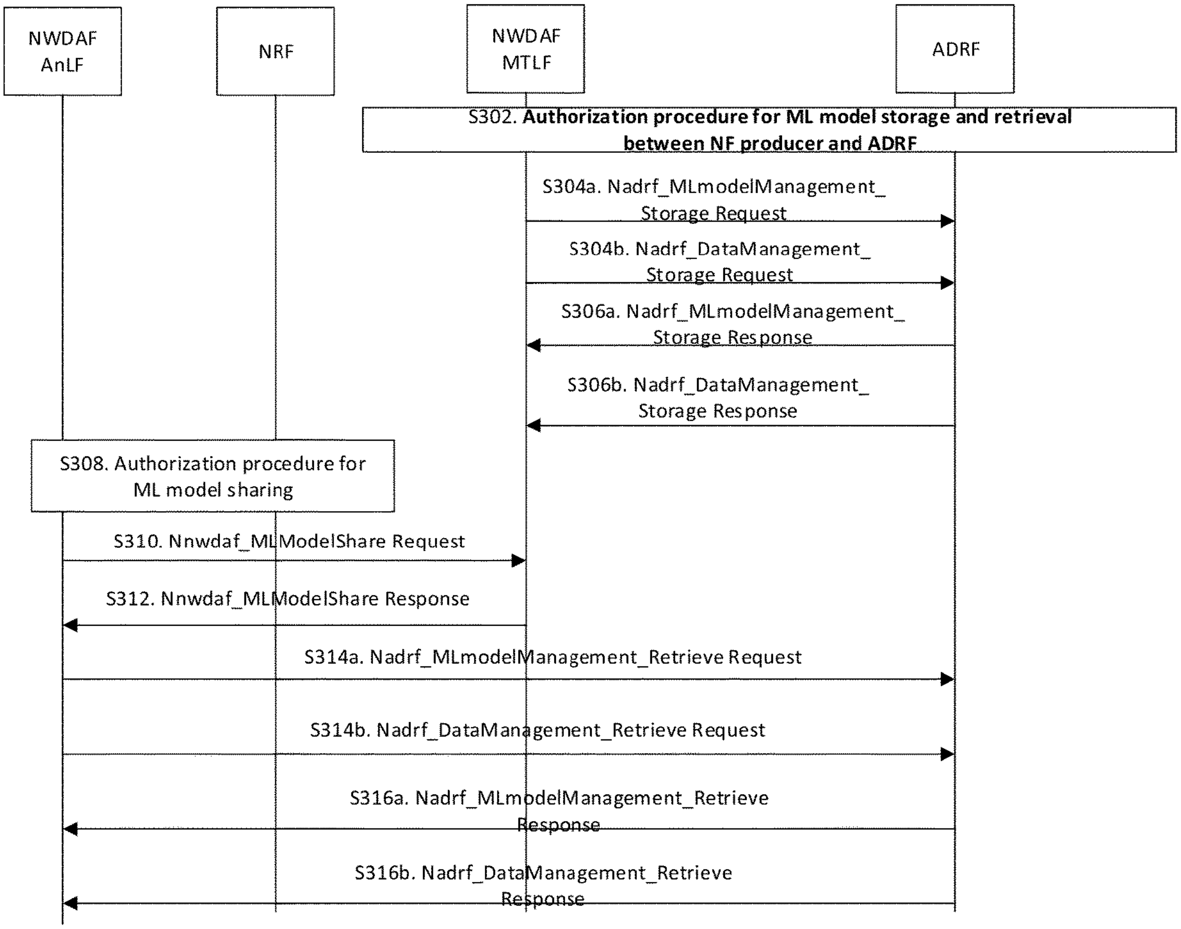
FIG. 3 illustrates a sequence diagram of another ML model storage and retrieval procedure in accordance with some embodiments of the disclosure.

FIG. 3 illustrates a sequence diagram of another ML model storage and retrieval procedure in accordance with some embodiments of the disclosure. As shown in FIG. 3, in some embodiments, when the NF consumer entity is a NWDAF entity containing AnLF and the NF producer entity is a NWDAF entity containing MTLF, the ML model storage and retrieval procedure includes:

S302, an authorization procedure for ML model storage and retrieval is implemented between the NWDAF entity containing MTLF and the ADRF entity.

S304*a*, the NWDAF entity containing MTLF sends a Nadrf_MLmodelManagement_Storage request, which includes the access token to the ADRF entity, the analytics identifier or the ML model identifier associated with the ML model file, and the container containing the ML model file or the network address associated with the ML model file, to the ADRF entity.

S306*a*, the ADRF entity sends a Nadrf_MLmodelManagement_Storage response, which includes the result indication for indicating storage status of the ML model file and the storage transaction identifier for identifying the pointer to the ML model file stored in the ADRF entity, to the NWDAF entity containing MTLF.

S308, an authorization procedure for ML model sharing between the NWDAF entity containing AnLF and the NWDAF entity containing MTLF is implemented. Details of this step are similar as those described for S114 in FIG. 1, and they are not described repeatedly.

S310, the NWDAF entity containing AnLF sends an Nnwdaf_MLModelShare request, which includes the access token to the NWDAF entity containing MTLF and the analytics identifier or the ML model identifier associated with the ML model file, to the NWDAF entity containing MTLF.

S312, the NWDAF entity containing MTLF sends an Nnwdaf_MLModelShare response, which includes the analytics identifier or the ML model identifier associated with the ML model file and the storage transaction identifier for identifying the pointer to the ML model file stored in the ADRF entity, to the NWDAF entity containing AnLF.

S314*a*, the NWDAF entity containing MTLF sends a Nadrf_MLmodelManagement_Retrieval request, which includes the ML model identifier associated with the ML model file and the storage transaction identifier for identifying the pointer to the ML model file stored in the ADRF entity, to the ADRF entity.

S316*a*, the ADRF entity sends a Nadrf_MLmodelManagement_Storage response, which includes the ML model identifier associated with the ML model file, the result indication for indicating storage status of the ML model file in the ADRF entity, and the container containing the ML model file or the network address associated with the ML model file, to the NWDAF entity containing MTLF.

It should be appreciated that S304*b* and S306*b* may be implemented instead of S304*a* and S306*a*. Specifically, the NWDAF entity containing MTLF may send a Nadrf_DataManagement_Storage request, which includes the access token to the ADRF entity, the analytics identifier associated with the ML model file, and the dataset tag identifying ML model type data, to the ADRF entity in S304*b*, and the ADRF entity may send a Nadrf_DataManagement_Storage response, which includes the result indication for indicating storage status of the ML model file in the ADRF entity and the container containing the ML model file or the network address associated with the ML model file, to the NWDAF entity containing MTLF in S306*b*.

It should be appreciated that S314*b* and S316*b* may be implemented instead of S314*a* and S316*a*. Specifically, the NWDAF entity containing AnLF may send a Nadrf_DataManagement_Retrieve request, which includes the storage transaction identifier for identifying the pointer to the ML model file stored in the ADRF entity and the dataset tag identifying ML model type data, to the ADRF entity in S314*b*, and the ADRF entity may send a Nadrf_DataManagement_Retrieve response, which includes the result indication for indicating storage status of the ML model file in the ADRF entity and the container containing the ML model file or the network address associated with the ML model file, to the NWDAF entity containing AnLF in S316*b*.

Figure 4:
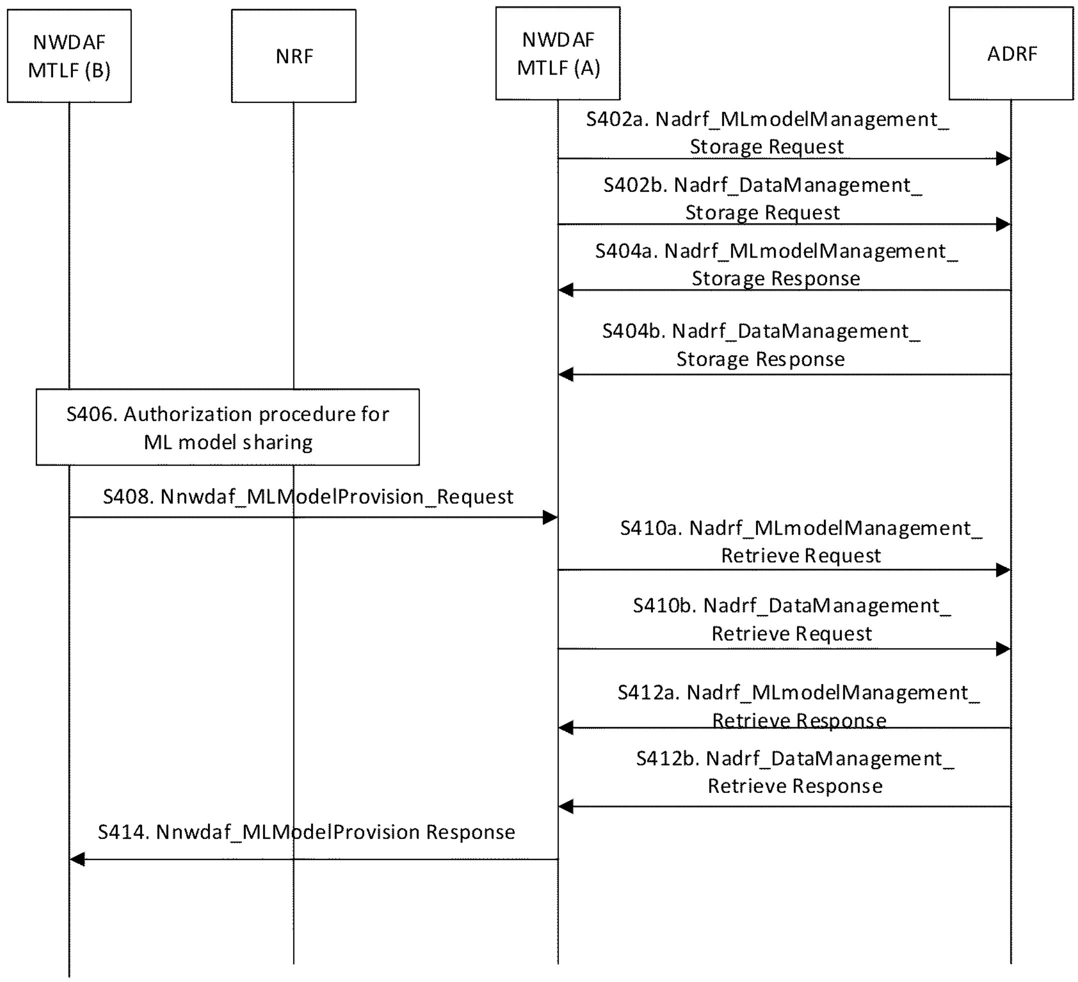
FIG. 4 illustrates a sequence diagram of yet another ML model storage and retrieval procedure in accordance with some embodiments of the disclosure.

FIG. 4 illustrates a sequence diagram of yet another ML model storage and retrieval procedure in accordance with some embodiments of the disclosure. As shown in FIG. 4, in some embodiments, when the NF consumer entity is a NWDAF entity containing MTLF (for example, MTLF A) and the NF producer entity is another NWDAF entity containing MTLF (for example, MTLF B), the ML model storage and retrieval procedure includes:

S402*a*, MTLF A sends a Nadrf_MLmodelManagement_Storage request, which includes the analytics identifier or the ML model identifier associated with the ML model file and the container containing the ML model file or the network address associated with the ML model file, to the ADRF entity.

S404*a*, the ADRF entity sends a Nadrf_MLmodelManagement_Storage response, which includes the result indication for indicating storage status of the ML model file and the storage transaction identifier for identifying the pointer to the ML model file stored in the ADRF entity, to MTLF A.

S406, an authorization procedure for ML model sharing between MTLF B and MTLF A is implemented. Details of this step are similar as those described for S114 in FIG. 1, and they are not described repeatedly.

S408, MTLF B sends an Nnwdaf_MLModelProvision request, which includes the access token to MTLF A and the analytics identifier or the ML model identifier associated with the ML model file, to MTLF A.

S410*a*, MTLF A sends a Nadrf_MLmodelManagement_Retrieve request, which includes the ML model identifier associated with the ML model file and the storage transaction identifier for identifying the pointer to the ML model file stored in the ADRF entity, to the ADRF entity.

S412*a*, the ADRF entity sends a Nadrf_MLmodelManagement_Retrieve response, which includes the ML model identifier associated with the ML model file, the result indication for indicating storage status of the ML model file in the ADRF entity, and the container containing the ML model file or the network address associated with the ML model file, to MTLF A.

S414, MTLF A sends an Nnwdaf_MLModelProvision response, which includes the analytics identifier or the ML model identifier associated with the ML model file and the container containing the ML model file or the network address associated with the ML model file, to MTLF B.

It should be appreciated that S402*b* and S404*b* may be implemented instead of S402*a* and S404*a*. Specifically, MTLF A may send a Nadrf_DataManagement_Storage request, which includes the analytics identifier associated with the ML model file and the dataset tag identifying ML model type data, to the ADRF entity in S402*b*, and the ADRF entity may send a Nadrf_DataManagement_Storage response, which includes the result indication for indicating storage status of the ML model file in the ADRF entity and the container containing the ML model file or the network address associated with the ML model file, to MTLF A in S404*b*.

It should also be appreciated that S410*b* and S412*b* may be implemented instead of S410*a* and S412*a*. Specifically, MTLF A may send a Nadrf_DataManagement_Retrieve request, which includes the storage transaction identifier for identifying the pointer to the ML model file stored in the ADRF entity and the dataset tag identifying ML model type data, to the ADRF entity in S410*b*, and the ADRF entity may send a Nadrf_DataManagement_Retrieve response, which includes the result indication for indicating storage status of the ML model file in the ADRF entity and the container containing the ML model file or the network address associated with the ML model file, to MTLF A in S412*b*.

Figure 5:
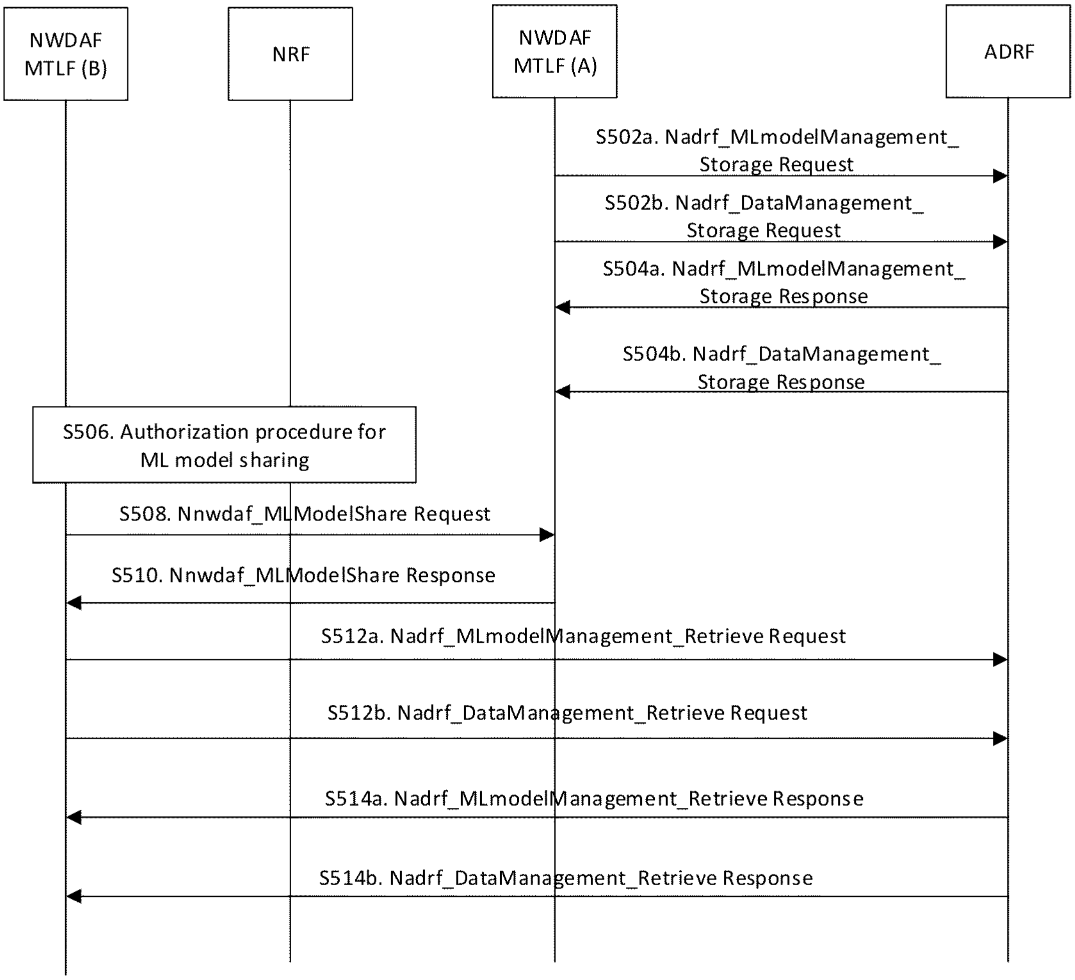
FIG. 5 illustrates a sequence diagram of still another ML model storage and retrieval procedure in accordance with some embodiments of the disclosure.

FIG. 5 illustrates a sequence diagram of still another ML model storage and retrieval procedure in accordance with some embodiments of the disclosure. As shown in FIG. 5, in some embodiments, when the NF consumer entity is a NWDAF entity containing MTLF (for example, MTLF A) and the NF producer entity is another NWDAF entity containing MTLF (for example, MTLF B), the ML model storage and retrieval procedure includes:

S502*a*, MTLF A sends a Nadrf_MLmodelManagement_ Storage request, which includes the analytics identifier or the ML model identifier associated with the ML model file and the container containing the ML model file or the network address associated with the ML model file, to the ADRF entity.

S504*a*, the ADRF entity sends a Nadrf_MLmodelManagement_Storage response, which includes the result indication for indicating storage status of the ML model file and the storage transaction identifier for identifying the pointer to the ML model file stored in the ADRF entity, to MTLF A.

S506, an authorization procedure for ML model sharing between MTLF B and MTLF A is implemented. Details of this step are similar as those described for S114 in FIG. 1, and they are not described repeatedly.

S508, MTLF B sends an Nnwdaf_MLModelShare request, which includes the access token to MTLF A and the analytics identifier or the ML model identifier associated with the ML model file, to MTLF A.

S510, MTLF A sends an Nnwdaf_MLModelShare response, which includes the analytics identifier or the ML model identifier associated with the ML model file and the storage transaction identifier for identifying the pointer to the ML model file stored in the ADRF entity, to MTLF B.

S512*a*, MTLF B sends a Nadrf_MLmodelManagement_Retrieval request, which includes the ML model identifier associated with the ML model file and the storage transaction identifier for identifying the pointer to the ML model file stored in the ADRF entity, to the ADRF entity.

S514*a*, the ADRF entity sends a Nadrf_MLmodelManagement_Retreive response, which includes the ML model identifier associated with the ML model file, the result indication for indicating storage status of the ML model file in the ADRF entity, and the container containing the ML model file or the network address associated with the ML model file, to MTLF B.

It should be appreciated that S502*b* and S504*b* may be implemented instead of S502*a* and S504*a*. Specifically, MTLF A may send a Nadrf_DataManagement_Storage request, which includes the analytics identifier associated with the ML model file and the dataset tag identifying ML model type data, to the ADRF entity in S502*b*, and the ADRF entity may send a Nadrf_DataManagement_Storage response, which includes the result indication for indicating storage status of the ML model file in the ADRF entity and the container containing the ML model file or the network address associated with the ML model file, to MTLF A in S504*b*.

It should also be appreciated that S512*b* and S514*b* may be implemented instead of S512*a* and S514*a*. Specifically, MTLF B may send a Nadrf_DataManagement_Retrieve request, which includes the storage transaction identifier for identifying the pointer to the ML model file stored in the ADRF entity and the dataset tag identifying ML model type data, to the ADRF entity in S512*b*, and the ADRF entity may send a Nadrf_DataManagement_Retrieve response, which includes the result indication for indicating storage status of the ML model file in the ADRF entity and the container containing the ML model file or the network address associated with the ML model file, to MTLF B in S514*b*.

Figure 6:
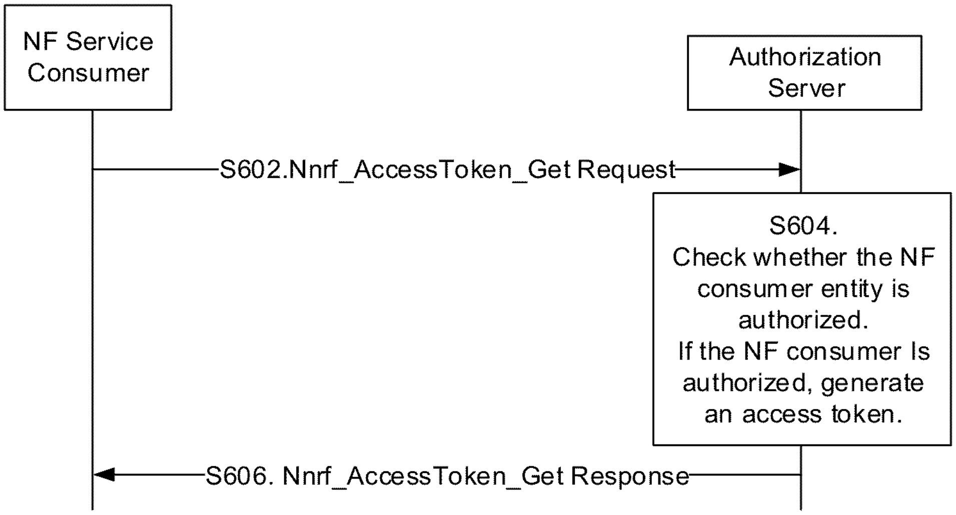
FIG. 6 illustrates a procedure of the NF consumer entity obtaining an access token for accessing services of the NF producer entity in accordance with some embodiments of the disclosure.

FIG. 6 illustrates a procedure of the NF consumer entity obtaining an access token for accessing services of the NF producer entity in accordance with some embodiments of the disclosure. As shown in FIG. 6, in some embodiments, the procedure of the NF consumer entity obtaining the access token for accessing services of the NF producer entity includes:

S602, the NF consumer entity sends an Nnrf_AccessToken_Get request, which includes the analytics identifier or the ML model identifier associated with the ML model file, the vendor identifier associated with the NF consumer entity, and the information associated with the NF producer entity, to an authorization server.

S604, the authorization server may verify that input parameters (e.g., NF type) in the Nnrf_AccessToken_Get request match with corresponding ones in a public key certificate of the NF consumer entity or those in the network function profile of the NF consumer entity. The authorization server checks whether the NF consumer entity is authorized to access requested services (for example, MTLF accessing ADRF or ANLF accessing ADRF directly or MTLF accessing another MTLF) from the NF producer entity. If the NF consumer entity is authorized, the authorization server may generate the access token to the NF producer entity. For example, the Nnrf_AccessToken_Get request may further contains consumer NF type and/or identifier, expected NF service names and NF type and so on, and the authorization server may, based on the network function profile of the NF producer entity, check whether the NF consumer entity is authorized to access the NF producer entity for storage and retrieve of the ML model file and generates the access token to the NF producer entity.

S606, if the authorization is successful, the authorization server sends an Nnrf_AccessToken_Get response, which the access token to the NF producer entity and the analytics identifier or the ML model identifier associated with the ML model file, to the NF consumer entity.

It should be appreciated that the procedure shown in FIG. 6 may be applied to for example, S114*c* and S114*d* in FIGS. 1, S202 and S208 in FIGS. 2, S302 and S308 in FIG. 3, S406 in FIG. 4, and S506 in FIG. 5. When the procedure shown in FIG. 6 is applied to S208 in FIGS. 2 and S308 in FIG. 3, the NF consumer entity is the NWDAF entity containing AnLF, and the authentication server is the NRF entity. When the procedure shown in FIG. 6 is applied to S202 in FIGS.

2 and S302 in FIG. 3, the NF consumer entity is the NWDAF entity containing MTLF, and the authentication server is the ADRF entity. When the procedure shown in FIG. 6 is applied to S406 in FIGS. 4 and S506 in FIG. 5, the NF consumer entity is MTLF B, and the Authentication server is the NRF entity.

Figure 7:
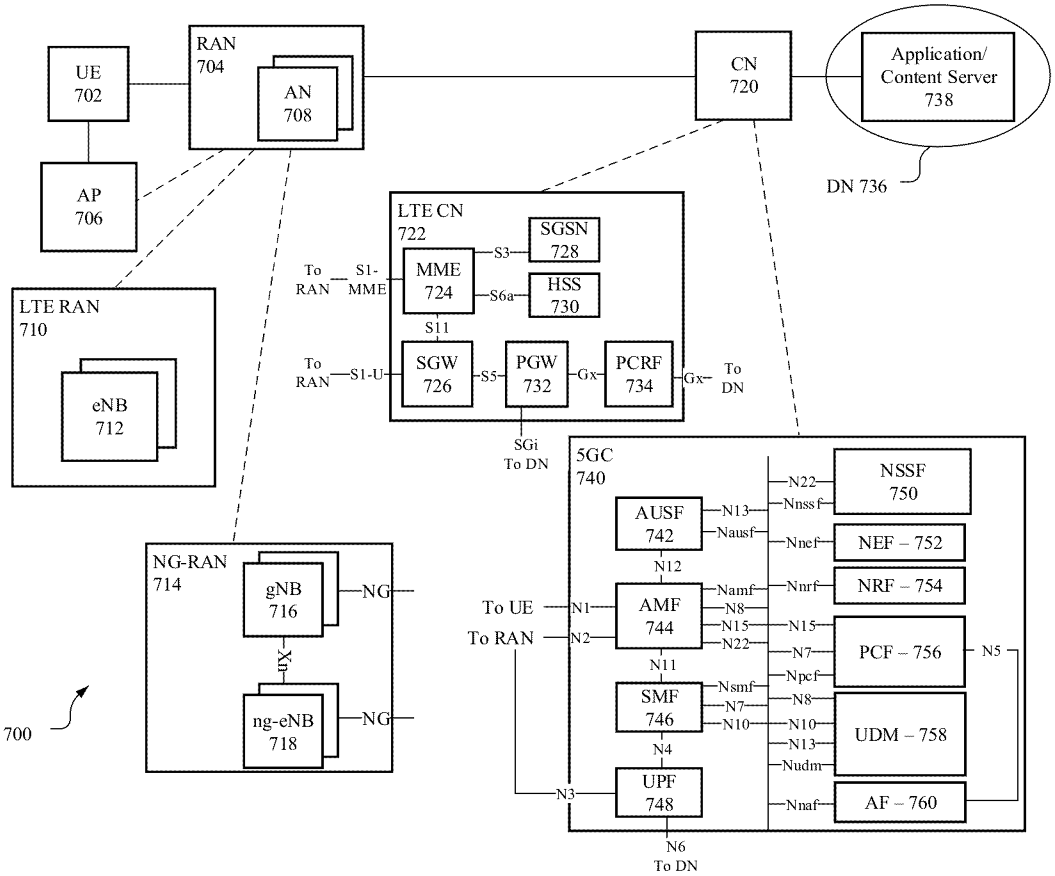
FIG. 7 illustrates a diagram of a network in accordance with various embodiments of the disclosure.
Figure 8:
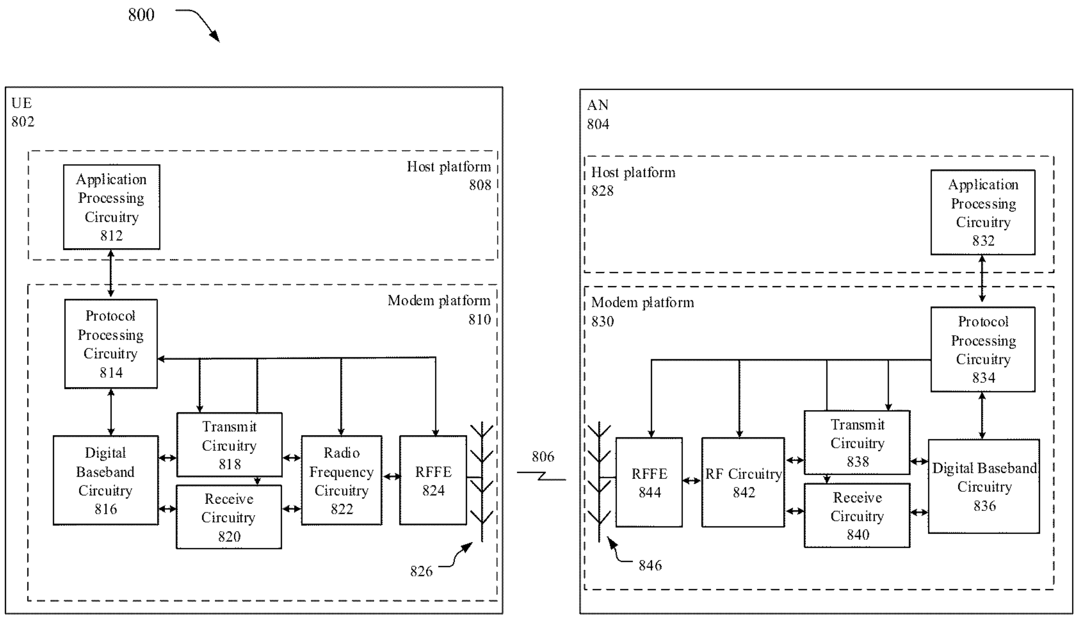
FIG. 8 illustrates a diagram of a wireless network in accordance with various embodiments of the disclosure.

FIGS. 7-8 illustrate various systems, devices, and components that may implement aspects of disclosed embodiments.

FIG. 7 illustrates a diagram of a network 700 in accordance with various embodiments of the disclosure. The network 700 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 700 may include a UE 702, which may include any mobile or non-mobile computing device designed to communicate with a Radio Access Network (RAN) 704 via an over-the-air connection. The UE 702 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 700 may include a plurality of UEs coupled directly with one another via a sidelink interface. The UEs may be M2M/D2D devices that communicate using physical sidelink channels such as, but not limited to, Physical Sidelink Broadcasting Channel (PSBCH), Physical Sidelink Discovery Channel (PSDCH), Physical Sidelink Shared Channel (PSSCH), Physical Sidelink Control Channel (PSCCH), Physical Sidelink Fundamental Channel (PSFCH), etc.

In some embodiments, the UE 702 may additionally communicate with an Access Point (AP) 706 via an over-the-air connection. The AP 706 may manage a WLAN connection, which may serve to offload some/all network traffic from the RAN 704. The connection between the UE 702 and the AP 706 may be consistent with any IEEE 802.11 protocol, wherein the AP 706 could be a wireless fidelity (Wi-Fi®) router. In some embodiments, the UE 702, RAN 704, and AP 706 may utilize cellular-WLAN aggregation (for example, LTE-WLAN Aggregation (LWA)/Light weight IP (LWIP)). Cellular-WLAN aggregation may involve the UE 702 being configured by the RAN 704 to utilize both cellular radio resources and WLAN resources.

The RAN 704 may include one or more access nodes, for example, AN 708. AN 708 may terminate air-interface protocols for the UE 702 by providing access stratum protocols including RRC, Packet Data Convergence Protocol (PDCP), Radio Link Control (RLC), Medium Access Control (MAC), and L1 protocols. In this manner, the AN 708 may enable data/voice connectivity between CN 720 and the UE 702. In some embodiments, the AN 708 may be implemented in a discrete device or as one or more software entities running on server computers as part of, for example, a virtual network, which may be referred to as a CRAN or virtual baseband unit pool. The AN 708 be referred to as a BS, gNB, RAN node, eNB, ng-eNB, NodeB, Road Side Unit (RSU), TRxP, TRP, etc. The AN 708 may be a macrocell base station or a low power base station for providing femtocells, picocells or other like cells having smaller coverage areas, smaller user capacity, or higher bandwidth compared to macrocells.

In embodiments in which the RAN 704 includes a plurality of Access Networks (ANs), they may be coupled with one another via an X2 interface (if the RAN 704 is an LTE RAN) or an Xn interface (if the RAN 704 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 704 may each manage one or more cells, cell groups, component carriers, etc. to provide the UE 702 with an air interface for network access. The UE 702 may be simultaneously connected with a plurality of cells provided by the same or different ANs of the RAN 704. For example, the UE 702 and RAN 704 may use carrier aggregation to allow the UE 702 to connect with a plurality of component carriers, each corresponding to a Primary cell (Pcell) or Secondary cell (Scell). In dual connectivity scenarios, a first AN may be a master node that provides a Master Cell Group (MCG) and a second AN may be secondary node that provides a Secondary Cell Group (SCG). The first/second ANs may be any combination of eNB, gNB, ng-eNB, etc.

The RAN 704 may provide the air interface over a licensed spectrum or an unlicensed spectrum. To operate in the unlicensed spectrum, the nodes may use Licensed Assisted Access (LAA), enhanced LAA (eLAA), and/or further enhanced LAA (feLAA) mechanisms based on Carrier Aggregation (CA) technology with PCells/Scells. Prior to accessing the unlicensed spectrum, the nodes may perform medium/carrier-sensing operations based on, for example, a listen-before-talk (LBT) protocol.

In Vehicle-to-everything (V2X) scenarios, the UE 702 or AN 708 may be or act as a Road Side Unit (RSU), which may refer to any transportation infrastructure entity used for V2X communications. An RSU may be implemented in or by a suitable AN or a stationary (or relatively stationary) UE. An RSU implemented in or by a UE may be referred to as a "UE-type RSU"; an eNB may be referred to as an "eNB-type RSU"; a next-generation NodeB (gNB) may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 704 may be an LTE RAN 710 with evolved NodeBs (eNBs), for example, eNB 712. The LTE RAN 710 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH Demodulation Reference Signal (DMRS) for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 704 may be a Next Generation (NG)-RAN 714 with gNBs, for example, gNB 716, or ng-eNBs, for example, ng-eNB 718. The gNB 716 may connect with 5G-enabled UEs using a 5G NR interface. The gNB 716 may connect with a 5G core through an NG interface, which may include an N2 interface or an N3 interface. The ng-eNB 718 may also connect with the 5G core through an NG interface, but may connect with a UE via an LTE air interface. The gNB 716 and the ng-eNB 718 may connect with each other over an Xn interface.

In some embodiments, the NG interface may be split into two parts, an NG user plane (NG-U) interface, which carries traffic data between the nodes of the NG-RAN 714 and a UPF 748 (e.g., N3 interface), and an NG control plane (NG-C) interface, which is a signaling interface between the nodes of the NG-RAN 714 and an Access and Mobility Management Function (AMF) 744 (e.g., N2 interface).

The NG-RAN 714 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 702 can be configured with multiple BWPs where each BWP configuration has a different SCS. When a BWP change is indicated to the UE 702, the SCS of the transmission is changed as well. Another use case example of BWP is related to power saving. In particular, multiple BWPs can be configured for the UE 702 with different amount of frequency resources (for example, PRBs) to support data transmission under different traffic loading scenarios. A BWP containing a smaller number of PRBs can be used for data transmission with small traffic load while allowing power saving at the UE 702 and in some cases at the gNB 716. A BWP containing a larger number of PRBs can be used for scenarios with higher traffic load.

The RAN 704 is communicatively coupled to CN 720 that includes network elements to provide various functions to support data and telecommunications services to customers/subscribers (for example, users of UE 702). The components of the CN 720 may be implemented in one physical node or separate physical nodes. In some embodiments, NFV may be utilized to virtualize any or all of the functions provided by the network elements of the CN 720 onto physical compute/storage resources in servers, switches, etc. A logical instantiation of the CN 720 may be referred to as a network slice, and a logical instantiation of a portion of the CN 720 may be referred to as a network sub-slice.

In some embodiments, the CN 720 may be an LTE CN 722, which may also be referred to as an EPC. The LTE CN 722 may include Mobility Management Entity (MME) 724, Serving Gateway (SGW) 726, Serving GPRS Support Node (SGSN) 728, Home Subscriber Server (HSS) 730, Proxy Gateway (PGW) 732, and Policy Control and Charging Rules Function (PCRF) 734 coupled with one another over interfaces (or "reference points") as shown. Functions of the elements of the LTE CN 722 may be briefly introduced as follows.

The MME 724 may implement mobility management functions to track a current location of the UE 702 to facilitate paging, bearer activation/deactivation, handovers, gateway selection, authentication, etc.

The SGW 726 may terminate an S1 interface toward the RAN and route data packets between the RAN and the LTE CN 722. The SGW 726 may be a local mobility anchor point for inter-RAN node handovers and also may provide an anchor for inter-3GPP mobility. Other responsibilities may include lawful intercept, charging, and some policy enforcement.

The SGSN 728 may track a location of the UE 702 and perform security functions and access control. In addition, the SGSN 728 may perform inter-EPC node signaling for mobility between different RAT networks; PDN and S-GW selection as specified by MME 724; MME selection for handovers; etc. The S3 reference point between the MME 724 and the SGSN 728 may enable user and bearer information exchange for inter-3GPP access network mobility in idle/active states.

The HSS 730 may include a database for network users, including subscription-related information to support the network entities' handling of communication sessions. The HSS 730 can provide support for routing/roaming, authentication, authorization, naming/addressing resolution, location dependencies, etc. An S6*a* reference point between the HSS 730 and the MME 724 may enable transfer of subscription and authentication data for authenticating/authorizing user access to the LTE CN 720.

The PGW 732 may terminate a SGi interface toward a data network (DN) 736 that may include an application/content server 738. The PGW 732 may route data packets between the LTE CN 722 and the data network 736. The PGW 732 may be coupled with the SGW 726 by an S5 reference point to facilitate user plane tunneling and tunnel management. The PGW 732 may further include a node for policy enforcement and charging data collection (for example, PCEF). Additionally, the SGi reference point between the PGW 732 and the data network 736 may be an operator external public, a private PDN, or an intra-operator packet data network, for example, for provision of IMS services. The PGW 732 may be coupled with a PCRF 734 via a Gx reference point.

The PCRF 734 is the policy and charging control element of the LTE CN 722. The PCRF 734 may be communicatively coupled to the application/content server 738 to determine appropriate QoS and charging parameters for service flows. The PCRF 732 may provision associated rules into a PCEF (via Gx reference point) with appropriate TFT and QCI.

In some embodiments, the CN 720 may be a 5G Core network (5GC) 740. The 5GC 740 may include an Authentication Server Function (AUSF) 742, Access and Mobility Management Function (AMF) 744, Session Management Function (SMF) 746, User Plane Function (UPF) 748, Network Slice Selection Function (NSSF) 750, Network Exposure Function (NEF) 752, NF Repository Function (NRF) 754, Policy Control Function (PCF) 756, Unified Data Management (UDM) 758, and Application Function (AF) 760 coupled with one another over interfaces (or "reference points") as shown. Functions of the elements of the 5GC 740 may be briefly introduced as follows.

The AUSF 742 may store data for authentication of UE 702 and handle authentication-related functionality. The AUSF 742 may facilitate a common authentication framework for various access types. In addition to communicating with other elements of the 5GC 740 over reference points as shown, the AUSF 742 may exhibit a Nausf service-based interface.

The AMF 744 may allow other functions of the 5GC 740 to communicate with the UE 702 and the RAN 704 and to subscribe to notifications about mobility events with respect to the UE 702. The AMF 744 may be responsible for registration management (for example, for registering UE 702), connection management, reachability management, mobility management, lawful interception of AMF-related events, and access authentication and authorization. The AMF 744 may provide transport for Session Management (SM) messages between the UE 702 and the SMF 746, and act as a transparent proxy for routing SM messages. AMF 744 may also provide transport for SMS messages between UE 702 and an SMSF. AMF 744 may interact with the AUSF 742 and the UE 702 to perform various security anchor and context management functions. Furthermore, AMF 744 may be a termination point of a RAN CP interface, which may include or be an N2 reference point between the RAN 704 and the AMF 744; and the AMF 744 may be a termination point of NAS (N1) signaling, and perform NAS ciphering and integrity protection. AMF 744 may also support NAS signaling with the UE 702 over an N3 IWF interface.

The SMF 746 may be responsible for SM (for example, session establishment, tunnel management between UPF 748 and AN 708); UE IP address allocation and management (including optional authorization); selection and control of UP function; configuring traffic steering at UPF 748 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 744 over N2 to AN 708; and determining SSC mode of a session. SM may refer to management of a PDU session, and a PDU session or "session" may refer to a PDU connectivity service that provides or enables the exchange of PDUs between the UE 702 and the data network 736.

The UPF 748 may act as an anchor point for intra-RAT and inter-RAT mobility, an external PDU session point of interconnect to data network 736, and a branching point to support multi-homed PDU session. The UPF 748 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 748 may include an uplink classifier to support routing traffic flows to a data network.

The NSSF 750 may select a set of network slice instances serving the UE 702. The NSSF 750 may also determine allowed Network Slice Selection Assistance Information (NSSAI) and the mapping to the subscribed Single-NSSAIs (S-NSSAIs), if needed. The NSSF 750 may also determine the AMF set to be used to serve the UE 702, or a list of candidate AMFs based on a suitable configuration and possibly by querying the NRF 754. The selection of a set of network slice instances for the UE 702 may be triggered by the AMF 744 with which the UE 702 is registered by interacting with the NSSF 750, which may lead to a change of AMF. The NSSF 750 may interact with the AMF 744 via an N22 reference point; and may communicate with another NSSF in a visited network via an N31 reference point (not shown). Additionally, the NSSF 750 may exhibit an Nnssf service-based interface.

The NEF 752 may securely expose services and capabilities provided by 3 GPP network functions for third party, internal exposure/re-exposure, AFs (e.g., AF 760), edge computing or fog computing systems, etc. In such embodiments, the NEF 752 may authenticate, authorize, or throttle the AFs. NEF 752 may also translate information exchanged with the AF 760 and information exchanged with internal network functions. For example, the NEF 752 may translate between an AF-Service-Identifier and an internal 5GC information. NEF 752 may also receive information from other NFs based on exposed capabilities of other NFs. This information may be stored at the NEF 752 as structured data, or at a data storage NF using standardized interfaces. The stored information can then be re-exposed by the NEF 752 to other NFs and AFs, or used for other purposes such as analytics. Additionally, the NEF 752 may exhibit a Nnef service-based interface.

The NRF 754 may support service discovery functions, receive NF discovery requests from NF instances, and provide the information of the discovered NF instances to the NF instances. NRF 754 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 754 may exhibit the Nnrf service-based interface.

The PCF 756 may provide policy rules to control plane functions to enforce them, and may also support unified policy framework to govern network behavior. The PCF 756 may also implement a front end to access subscription information relevant for policy decisions in a UDR of the UDM 758. In addition to communicating with functions over reference points as shown, the PCF 756 exhibit an Npcf service-based interface.

The UDM 758 may handle subscription-related information to support the network entities' handling of communication sessions, and may store subscription data of UE 702. For example, subscription data may be communicated via an N8 reference point between the UDM 758 and the AMF 744. The UDM 758 may include two parts, an application front end and a UDR. The UDR may store subscription data and policy data for the UDM 758 and the PCF 756, and/or structured data for exposure and application data (including PFDs for application detection, application request information for multiple UEs 702) for the NEF 752. The Nudr service-based interface may be exhibited by the UDR to allow the UDM 758, PCF 756, and NEF 752 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 758 may exhibit the Nudm service-based interface.

The AF 760 may provide application influence on traffic routing, provide access to NEF, and interact with the policy framework for policy control.

In some embodiments, the 5GC 740 may enable edge computing by selecting operator/3rd party services to be geographically close to a point that the UE 702 is attached to the network. This may reduce latency and load on the network. To provide edge-computing implementations, the 5GC 740 may select a UPF 748 close to the UE 702 and execute traffic steering from the UPF 748 to data network 736 via the N6 interface. This may be based on the UE subscription data, UE location, and information provided by the AF 760. In this way, the AF 760 may influence UPF (re) selection and traffic routing. Based on operator deployment, when AF 760 is considered to be a trusted entity, the network operator may permit AF 760 to interact directly with relevant NFs. Additionally, the AF 760 may exhibit a Naf service-based interface.

The data network 736 may represent various network operator services, Internet access, or third party services that may be provided by one or more servers including, for example, application/content server 738.

FIG. 8 illustrates a wireless network 800 in accordance with various embodiments of the disclosure. The wireless network 800 may include a UE 802 in wireless communication with an AN 804. The UE 802 and AN 804 may be similar to, and substantially interchangeable with, like-named components described elsewhere herein.

The UE 802 may be communicatively coupled with the AN 804 via connection 806. The connection 806 is illustrated as an air interface to enable communicative coupling, and can be consistent with cellular communications protocols such as an LTE protocol or a 5G NR protocol operating at mmWave or sub-6 GHZ frequencies.

The UE 802 may include a host platform 808 coupled with a modem platform 810. The host platform 808 may include application processing circuitry 812, which may be coupled with protocol processing circuitry 814 of the modem platform 810. The application processing circuitry 812 may run various applications for the UE 802 that source/sink application data. The application processing circuitry 812 may further implement one or more layer operations to transmit/receive application data to/from a data network. These layer operations may include transport (for example UDP) and Internet (for example, IP) operations.

The protocol processing circuitry 814 may implement one or more of layer operations to facilitate transmission or reception of data over the connection 806. The layer operations implemented by the protocol processing circuitry 814 may include, for example, MAC, RLC, PDCP, RRC and NAS operations.

The modem platform 810 may further include digital baseband circuitry 816 that may implement one or more layer operations that are "below" layer operations performed by the protocol processing circuitry 814 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 810 may further include transmit circuitry 818, receive circuitry 820, RF circuitry 822, and RF front end (RFFE) circuit 824, which may include or connect to one or more antenna panels 826. Briefly, the transmit circuitry 818 may include a digital-to-analog converter, mixer, intermediate frequency (IF) components, etc.; the receive circuitry 820 may include an analog-to-digital converter, mixer, IF components, etc.; the RF circuitry 822 may include a low-noise amplifier, a power amplifier, power tracking components, etc.; RFFE circuit 824 may include filters (for example, surface/bulk acoustic wave filters), switches, antenna tuners, beamforming components (for example, phase-array antenna components), etc. The selection and arrangement of the components of the transmit circuitry 818, receive circuitry 820, RF circuitry 822, RFFE circuit 824, and antenna panels 826 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 814 may include one or more instances of control circuitry (not shown) to provide control functions for the transmit/receive components.

A UE reception may be established by and via the antenna panels 826, RFFE circuit 824, RF circuitry 822, receive circuitry 820, digital baseband circuitry 816, and protocol processing circuitry 814. In some embodiments, the antenna panels 826 may receive a transmission from the AN 804 by receiving beamforming signals received by a plurality of antennas/antenna elements of the one or more antenna panels 826.

A UE transmission may be established by and via the protocol processing circuitry 814, digital baseband circuitry 816, transmit circuitry 818, RF circuitry 822, RFFE circuitry 824, and antenna panels 826. In some embodiments, the transmit components of the UE 804 may apply a spatial filter to the data to be transmitted to form a transmit beam emitted by the antenna elements of the antenna panels 826.

Similar to the UE 802, the AN 804 may include a host platform 828 coupled with a modem platform 830. The host platform 828 may include application processing circuitry 832 coupled with protocol processing circuitry 834 of the modem platform 830. The modem platform may further include digital baseband circuitry 836, transmit circuitry 838, receive circuitry 840, RF circuitry 842, RFFE circuitry 844, and antenna panels 846. The components of the AN 804 may be similar to and substantially interchangeable with like-named components of the UE 802. In addition to performing data transmission/reception as described above, the components of the AN 808 may perform various logical functions that include, for example, RNC functions such as radio bearer management, uplink and downlink dynamic radio resource management, and data packet scheduling.

Figure 9:
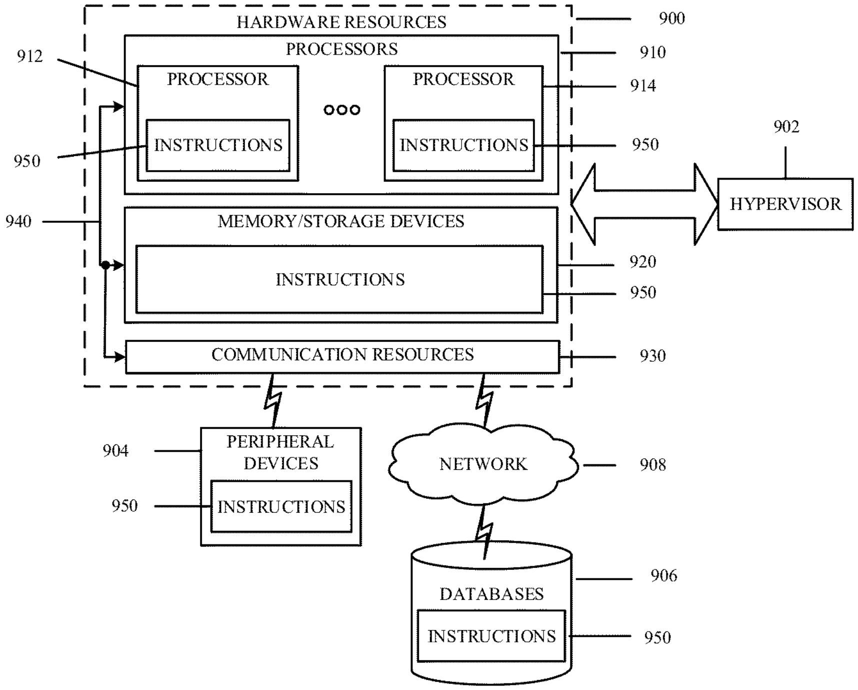
FIG. 9 illustrates a block diagram of components, in accordance with various embodiments of the disclosure, able to read instructions from a machine-readable or computer-readable medium (e.g., a non-transitory machine-readable storage medium) and perform any one or more of the methodologies discussed herein.

FIG. 9 illustrates a block diagram of components, according to some example embodiments of the disclosure, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 900 including one or more processors (or processor cores) 910, one or more memory/storage devices 920, and one or more communication resources 930, each of which may be communicatively coupled via a bus 940 or other interface circuitry. For embodiments where node virtualization (e.g., Network Function Virtualization (NFV)) is utilized, a hypervisor 902 may be executed to provide an execution environment for one or more network slices/sub-slices to utilize the hardware resources 900.

The processors 910 may include, for example, a processor 912 and a processor 914. The processors 910 may be, for example, a central processing unit (CPU), a reduced instruction set computing (RISC) processor, a complex instruction set computing (CISC) processor, a graphics processing unit (GPU), a DSP such as a baseband processor, an Application Specific Integrated Circuit (ASIC), an Field Programmable Gate Array (FPGA), a radio-frequency integrated circuit (RFIC), another processor (including those discussed herein), or any suitable combination thereof.

The memory/storage devices 920 may include main memory, disk storage, or any suitable combination thereof. The memory/storage devices 920 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 930 may include interconnection or network interface controllers, components, or other suitable devices to communicate with one or more peripheral devices 904 or one or more databases 906 or other network elements via a network 908. For example, the communication resources 930 may include wired communication components (e.g., for coupling via USB, Ethernet, etc.), cellular communication components, NFC components, Bluetooth® (or Bluetooth® Low Energy) components, Wi-Fi® components, and other communication components.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

The following paragraphs describe examples of various embodiments.

Example 1 includes an apparatus used in a Network Data Analytics Function (NWDAF) entity containing Model Training Logical Function (MTLF), wherein the apparatus comprises processor circuitry configured to cause the NWDAF entity containing MTLF to: receive, from another NWDAF entity containing Analytics Logical Function (AnLF) or MTLF, an ML model provision request, which comprises an access token to the NWDAF entity containing MTLF and an analytics identifier or a Machine Learning (ML) model identifier associated with an ML model file; and send, to the another NWDAF entity containing AnLF or MTLF, an ML model provision response, which comprises the analytics identifier or the ML model identifier associated with the ML model file and a container containing the ML model file or a network address associated with the ML model file.

Example 2 includes the apparatus of Example 1, wherein the processor circuitry is further configured to cause the NWDAF entity containing MTLF to: send, to an Analytics Data Repository Function (ADRF) entity, an ML model management storage request or a data management storage request, which comprises the analytics identifier or the ML model identifier associated with the ML model file and the container containing the ML model file or the network address associated with the ML model file; and receive, from the ADRF entity, an ML model management storage response or a data management storage response, which comprises a result indication for indicating storage status of the ML model file in the ADRF entity and a storage transaction identifier for identifying a pointer to the ML model file stored in the ADRF entity.

Example 3 includes the apparatus of Example 2, wherein the processor circuitry is further configured to cause the NWDAF entity containing MTLF to: send, to the ADRF entity, an ML model management retrieve request or a data management retrieve request, which comprises the storage transaction identifier for identifying the pointer to the ML model file stored in the ADRF entity; and receive, from the ADRF entity, an ML model management retrieve response or a data management retrieve response, which comprises the result indication for indicating storage status of the ML model file in the ADRF entity and the container containing the ML model file or the network address associated with the ML model file.

Example 4 includes the apparatus of Example 3, wherein the ML model management retrieve request and the ML model management retrieve response further comprise the ML model identifier associated with the ML model file.

Example 5 includes the apparatus of Example 3, wherein the data management storage request and the data management retrieve request further comprise a dataset tag identifying ML model type data.

Example 6 includes the apparatus of Example 3, wherein the processor circuitry is further configured to cause the NWDAF entity containing MTLF to: send, to the ADRF entity, an access token get request, which comprises the analytics identifier or the ML model identifier associated with the ML model file and a vendor identifier associated with the NWDAF entity containing MTLF; and receive, from the ADRF entity, an access token get response, which comprises the analytics identifier or the ML model identifier associated with the ML model file and an access token to the ADRF entity.

Example 7 includes the apparatus of Example 6, wherein the ML model management storage request or the data management storage request further comprises the access token to the ADRF entity.

Example 8 includes the apparatus of Example 7, wherein the ML model management retrieve request or the data management retrieve request further comprises the access token to the ADRF entity.

Example 9 includes the apparatus of Example 1, wherein the processor circuitry is further configured to cause the NWDAF entity containing MTLF to: register, in a Network Repository Function (NRF) entity, its network function profile, which comprises analytics identifiers associated with ML model files produced by the NWDAF entity containing MTLF and vendor identifiers allowed to access the ML model files based on the analytics identifiers.

Example 10 includes the apparatus of Example 1, wherein the processor circuitry is further configured to cause the NWDAF entity containing MTLF to encrypt ML model files produced by itself.

Example 11 includes the apparatus of Example 9, wherein the process circuitry is further configured to cause the NWDAF entity containing MTLF to: receive, from the NRF entity, another ML model provision request, which comprises the analytics identifier associated with the ML model file and a vendor identifier associated with the NRF entity; and send, to the NRF entity, another ML model provision response, which comprises the analytics identifier associated with the ML model file and the network address associated with the ML model file.

Example 12 includes an apparatus used in a Network Data Analytics Function (NWDAF) entity containing Model Training Logical Function (MTLF), wherein the apparatus comprises processor circuitry configured to cause the NWDAF entity containing MTLF to: receive, from another NWDAF entity containing Analytics Logical Function (AnLF) or MTLF, a Machine Learning (ML) model share request, which comprises an analytics identifier or an ML model identifier associated with an ML model file; and send, to the another NWDAF entity containing AnLF or MTLF, an ML model share response, which comprises the analytics identifier or the ML model identifier associated with the ML model file and a storage transaction identifier for identifying a pointer to the ML model file stored in an Analytics Data Repository Function (ADRF) entity.

Example 13 includes the apparatus of Example 12, wherein the processor circuitry is further configured to cause the NWDAF entity containing MTLF to: send, to an Analytics Data Repository Function (ADRF) entity, an ML model management storage request or a data management storage request, which comprises the analytics identifier or the ML model identifier associated with the ML model file and the container containing the ML model file or the network address associated with the ML model file; and receive, from the ADRF entity, an ML model management storage response or a data management storage response, which comprises a result indication for indicating storage status of the ML model file in the ADRF entity and a storage transaction identifier for identifying a pointer to the ML model file stored in the ADRF entity.

Example 14 includes the apparatus of Example 13, wherein the data management storage request further comprises a dataset tag identifying ML model type data.

Example 15 includes the apparatus of Example 13, wherein the processor circuitry is further configured to cause the NWDAF entity containing MTLF to: send, to the ADRF entity, an access token get request, which comprises the analytics identifier or the ML model identifier associated with the ML model file and a vendor identifier associated with the NWDAF entity containing MTLF; and receive, from the ADRF entity, an access token get response, which comprises the analytics identifier or the ML model identifier associated with the ML model file and an access token to the ADRF entity.

Example 16 includes the apparatus of Example 15, wherein the ML model management storage request or the data management storage request further comprises the access token to the ADRF entity.

Example 17 includes the apparatus of Example 12, wherein the processor circuitry is further configured to cause the NWDAF entity containing MTLF to encrypt the ML model files produced by itself.

Example 18 includes an apparatus used in a Network Data Analytics Function (NWDAF) entity containing Model Training Logical Function (MTLF) or Analytics Logical Function (AnLF), wherein the apparatus comprises processor circuitry configured to cause the NWDAF entity containing MTLF or AnLF to: send, to a Network Repository Function (NRF) entity, a Network Function (NF) discovery request, which comprises an analytics identifier associated with a Machine Learning (ML) model file and a vendor identifier associated with the NWDAF entity containing MTLF or AnLF; and receive, from the NRF entity, a NF discovery response, which comprises the analytics identifier or an ML model identifier associated with the ML model file and information associated with another NWDAF entity containing MTLF.

Example 19 includes the apparatus of Example 18, wherein the processor circuitry is further configured to cause the NWDAF entity containing MTLF or AnLF to: send, to the NRF entity, an access token get request, which comprises the analytics identifier or the ML model identifier associated with the ML model file, the vendor identifier associated with the NWDAF entity containing MTLF or AnLF, and the information associated with the another NWDAF entity containing MTLF; and receive, from the NRF entity, an access token get response, which comprises the analytics identifier or the ML model identifier associated with the ML model file and an access token to the another NWDAF entity containing MTLF.

Example 20 includes the apparatus of Example 19, wherein the processor circuitry is further configured to cause the NWDAF entity containing MTLF or AnLF to: send, to the another NWDAF entity containing MTLF, an ML model provision request, which comprises the access token to the another NWDAF entity containing MTLF and the analytics identifier or the ML model identifier associated with the ML model file; and receive, from the another NWDAF entity containing MTLF, an ML model provision response, which comprises the analytics identifier or the ML model identifier associated with the ML model file and a container containing the ML model file or the network address associated with the ML model file.

Example 21 includes the apparatus of Example 19, wherein the processor circuitry is further configured to cause the NWDAF entity containing MTLF or AnLF to: send, to the another NWDAF entity containing MTLF, an ML model share request, which comprises the access token to the another NWDAF entity containing MTLF and the analytics identifier or the ML model identifier associated with the ML model file; and receive, from the another NWDAF entity containing MTLF, an ML model share response, which comprises the analytics identifier or the ML model identifier associated with the ML model file and a storage transaction identifier for identifying a pointer to the ML model file stored in an Analytics Data Repository Function (ADRF) entity.

Example 22 includes the apparatus of Example 21, wherein the processor circuitry is further configured to cause the NWDAF entity containing MTLF or AnLF to: send, to the ADRF entity, an ML model management retrieve request, which comprises the ML model identifier associated with the ML model file and the storage transaction identifier for identifying the pointer to the ML model file stored in the ADRF entity; receive, from the ADRF entity, an ML model management retrieve response, which comprises the ML model identifier associated with the ML model file, the result indication for indicating storage status of the ML model file in the ADRF entity, and a container containing the ML model file or the network address associated with the ML model file.

Example 23 includes the apparatus of Example 21, wherein the processor circuitry is further configured to cause the NWDAF entity containing MTLF or AnLF to: send, to the ADRF entity, a data management retrieve request, which comprises the storage transaction identifier for identifying the pointer to the ML model file stored in the ADRF entity and a dataset tag identifying ML model type data; and receive, from the ADRF entity, a data management retrieve response, which comprises the result indication for indicating storage status of the ML model file in the ADRF entity and a container containing the ML model file or the network address associated with the ML model file.

Example 24 includes the apparatus of Example 18, wherein the processor circuitry is further configured to cause the NWDAF entity containing MTLF or AnLF to: register, in the NRF entity, its network function profile, which comprises analytics identifiers associated with ML model files supported for the NWDAF entity containing MTLF or AnLF and a vendor identifier associated with the NWDAF entity containing MTLF or AnLF.

Example 25 includes a method used in a Network Data Analytics Function (NWDAF) entity containing Model Training Logical Function (MTLF), wherein the method comprises: receiving, from another NWDAF entity containing Analytics Logical Function (AnLF) or MTLF, an ML model provision request, which comprises an access token to the NWDAF entity containing MTLF and an analytics identifier or a Machine Learning (ML) model identifier associated with an ML model file; and sending, to the another NWDAF entity containing AnLF or MTLF, an ML model provision response, which comprises the analytics identifier or the ML model identifier associated with the ML model file and a container containing the ML model file or a network address associated with the ML model file.

Example 26 includes the method of Example 25, wherein the method further comprises: sending, to an Analytics Data Repository Function (ADRF) entity, an ML model management storage request or a data management storage request, which comprises the analytics identifier or the ML model identifier associated with the ML model file and the container containing the ML model file or the network address associated with the ML model file; and receiving, from the ADRF entity, an ML model management storage response or a data management storage response, which comprises a result indication for indicating storage status of the ML model file in the ADRF entity and a storage transaction identifier for identifying a pointer to the ML model file stored in the ADRF entity.

Example 27 includes the method of Example 26, wherein the method further comprises: sending, to the ADRF entity, an ML model management retrieve request or a data management retrieve request, which comprises the storage transaction identifier for identifying the pointer to the ML model file stored in the ADRF entity; and receiving, from the ADRF entity, an ML model management retrieve response or a data management retrieve response, which comprises the result indication for indicating storage status of the ML model file in the ADRF entity and the container containing the ML model file or the network address associated with the ML model file.

Example 28 includes the method of Example 27, wherein the ML model management retrieve request and the ML model management retrieve response further comprise the ML model identifier associated with the ML model file.

Example 29 includes the method of Example 27, wherein the data management storage request and the data management retrieve request further comprise a dataset tag identifying ML model type data.

Example 30 includes the method of Example 27, wherein the method further comprises: sending, to the ADRF entity, an access token get request, which comprises the analytics identifier or the ML model identifier associated with the ML model file and a vendor identifier associated with the NWDAF entity containing MTLF; and receiving, from the ADRF entity, an access token get response, which comprises the analytics identifier or the ML model identifier associated with the ML model file and an access token to the ADRF entity.

Example 31 includes the method of Example 30, wherein the ML model management storage request or the data management storage request further comprises the access token to the ADRF entity.

Example 32 includes the method of Example 31, wherein the ML model management retrieve request or the data management retrieve request further comprises the access token to the ADRF entity.

Example 33 includes the method of Example 25, wherein the method further comprises: registering, in a Network Repository Function (NRF) entity, its network function profile, which comprises analytics identifiers associated with ML model files produced by the NWDAF entity containing MTLF and vendor identifiers allowed to access the ML model files based on the analytics identifiers.

Example 34 includes the method of Example 25, wherein the method further comprises encrypting ML model files produced by itself.

Example 35 includes the method of Example 34, wherein the method further comprises: receiving, from the NRF entity, another ML model provision request, which comprises the analytics identifier associated with the ML model file and a vendor identifier associated with the NRF entity; and sending, to the NRF entity, another ML model provision response, which comprises the analytics identifier associated with the ML model file and the network address associated with the ML model file.

Example 36 includes a method used in a Network Data Analytics Function (NWDAF) entity containing Model Training Logical Function (MTLF), wherein the method comprises: receiving, from another NWDAF entity containing Analytics Logical Function (AnLF) or MTLF, a Machine Learning (ML) model share request, which comprises an analytics identifier or an ML model identifier associated with an ML model file; and sending, to the another NWDAF entity containing AnLF or MTLF, an ML model share response, which comprises the analytics identifier or the ML model identifier associated with the ML model file and a storage transaction identifier for identifying a pointer to the ML model file stored in an Analytics Data Repository Function (ADRF) entity.

Example 37 includes the method of Example 36, wherein the method further comprises: sending, to an Analytics Data Repository Function (ADRF) entity, an ML model management storage request or a data management storage request, which comprises the analytics identifier or the ML model identifier associated with the ML model file and the container containing the ML model file or the network address associated with the ML model file; and receiving, from the ADRF entity, an ML model management storage response or a data management storage response, which comprises a result indication for indicating storage status of the ML model file in the ADRF entity and a storage transaction identifier for identifying a pointer to the ML model file stored in the ADRF entity.

Example 38 includes the method of Example 37, wherein the data management storage request further comprises a dataset tag identifying ML model type data.

Example 39 includes the method of Example 37, wherein the method further comprises: sending, to the ADRF entity, an access token get request, which comprises the analytics identifier or the ML model identifier associated with the ML model file and a vendor identifier associated with the NWDAF entity containing MTLF; and receiving, from the ADRF entity, an access token get response, which comprises the analytics identifier or the ML model identifier associated with the ML model file and an access token to the ADRF entity.

Example 40 includes the method of Example 39, wherein the ML model management storage request or the data management storage request further comprises the access token to the ADRF entity.

Example 41 includes the method of Example 36, wherein the method further comprises encrypting the ML model files produced by itself.

Example 42 includes a method used in a Network Data Analytics Function (NWDAF) entity containing Model Training Logical Function (MTLF) or Analytics Logical Function (AnLF), wherein the method comprises: sending, to a Network Repository Function (NRF) entity, a Network Function (NF) discovery request, which comprises an analytics identifier associated with a Machine Learning (ML) model file and a vendor identifier associated with the NWDAF entity containing MTLF or AnLF; and receiving, from the NRF entity, a NF discovery response, which comprises the analytics identifier or an ML model identifier associated with the ML model file and information associated with another NWDAF entity containing MTLF.

Example 43 includes the method of Example 42, wherein the method further comprises: sending, to the NRF entity, an access token get request, which comprises the analytics identifier or the ML model identifier associated with the ML model file, the vendor identifier associated with the NWDAF entity containing MTLF or AnLF, and the information associated with the another NWDAF entity containing MTLF; and receiving, from the NRF entity, an access token get response, which comprises the analytics identifier or the ML model identifier associated with the ML model file and an access token to the another NWDAF entity containing MTLF.

Example 44 includes the method of Example 43, wherein the method further comprises: sending, to the another NWDAF entity containing MTLF, an ML model provision request, which comprises the access token to the another NWDAF entity containing MTLF and the analytics identifier or the ML model identifier associated with the ML model file; and receiving, from the another NWDAF entity containing MTLF, an ML model provision response, which comprises the analytics identifier or the ML model identifier associated with the ML model file and a container containing the ML model file or the network address associated with the ML model file.

Example 45 includes the method of Example 43, wherein the method further comprises: sending, to the another NWDAF entity containing MTLF, an ML model share request, which comprises the access token to the another NWDAF entity containing MTLF and the analytics identifier or the ML model identifier associated with the ML model file; and receiving, from the another NWDAF entity containing MTLF, an ML model share response, which comprises the analytics identifier or the ML model identifier associated with the ML model file and a storage transaction identifier for identifying a pointer to the ML model file stored in an Analytics Data Repository Function (ADRF) entity.

Example 46 includes the method of Example 45, wherein the method further comprises: sending, to the ADRF entity, an ML model management retrieve request, which comprises the ML model identifier associated with the ML model file and the storage transaction identifier for identifying the pointer to the ML model file stored in the ADRF entity; receiving, from the ADRF entity, an ML model management retrieve response, which comprises the ML model identifier associated with the ML model file, the result indication for indicating storage status of the ML model file in the ADRF entity, and a container containing the ML model file or the network address associated with the ML model file.

Example 47 includes the method of Example 45, wherein the method further comprises: sending, to the ADRF entity, a data management retrieve request, which comprises the storage transaction identifier for identifying the pointer to the ML model file stored in the ADRF entity and a dataset tag identifying ML model type data; and receiving, from the ADRF entity, a data management retrieve response, which comprises the result indication for indicating storage status of the ML model file in the ADRF entity and a container containing the ML model file or the network address associated with the ML model file.

Example 48 includes the method of Example 42, wherein the method further comprises: registering, in the NRF entity, its network function profile, which comprises analytics identifiers associated with ML model files supported for the NWDAF entity containing MTLF or AnLF and a vendor identifier associated with the NWDAF entity containing MTLF or AnLF.

Example 49 includes a computer readable storage medium storing computer executable instructions thereon, wherein the computer executable instructions, when executed by processor circuitry of a Network Data Analytics Function (NWDAF) entity containing Model Training Logical Function (MTLF), cause the NWDAF entity containing MTLF to implement the method of any one of Examples 25-41.

Example 50 includes an apparatus used in a Network Data Analytics Function (NWDAF) entity containing Model Training Logical Function (MTLF), wherein the apparatus comprises means for implementing the method of any one of Examples 25-41.

Example 51 includes a computer readable storage medium storing computer executable instructions thereon, wherein the computer executable instructions, when executed by processor circuitry of a Network Data Analytics Function (NWDAF) entity containing Model Training Logical Function (MTLF) or Analytics Logical Function (AnLF), cause the NWDAF entity containing MTLF or AnLF to implement the method of any one of Examples 42-48.

Example 52 includes an apparatus used in a Network Data Analytics Function (NWDAF) entity containing Model Training Logical Function (MTLF) or Analytics Logical Function (AnLF), wherein the apparatus comprises means for implementing the method of any one of Examples 42-48.

Example 53 includes a Network Data Analytics Function (NWDAF) entity containing Model Training Logical Function (MTLF), wherein the NWDAF entity containing MTLF comprises the apparatus of any one any one of Examples 1-17.

Example 54 includes a Network Data Analytics Function (NWDAF) entity containing Model Training Logical Function (MTLF) or Analytics Logical Function (AnLF), wherein the NWDAF entity containing MTLF or AnLF comprises the apparatus of any one of Examples 18-24.

Although certain embodiments have been illustrated and described herein for purposes of description, a wide variety of alternate and/or equivalent embodiments or implementations to achieve the same purposes may be substituted for the embodiments shown and described without departing from the scope of the present disclosure. This application is intended to cover any adaptations or variations of the embodiments discussed herein. Therefore, it is manifestly intended that embodiments described herein are limited by the appended claims and the equivalents thereof.

What is claimed is:

1. An apparatus used in a Network Data Analytics Function (NWDAF) entity containing Model Training Logical Function (MTLF), the apparatus comprising:
- a memory; and
- processor circuitry coupled with the memory and configured to cause the NWDAF entity containing MTLF to:
  - send, to an Analytics Data Repository Function (ADRF) entity, a machine learning (ML) model management storage request, which comprises an ML model identifier associated with an ML model file and an address for the ML model file; and
  - receive, from the ADRF entity, a response to the ML model management storage request, the response comprising a result indication for ML model storage.

2. The apparatus of claim 1, wherein the processor circuitry is further configured to cause the NWDAF entity containing MTLF to:
- send, to the ADRF entity, an ML model management retrieval request, which comprises a storage transaction identifier for an ML model file stored in the ADRF entity or an ML model identifier associated with the ML model file; and
- receive, from the ADRF entity, a response to the ML model management retrieval request, the response comprising a result indication for ML model retrieval.

3. The apparatus of claim 2, wherein the processor circuitry is further configured to cause the NWDAF entity containing MTLF to:
- receive, from a Network Function (NF) consumer, a request for an ML model;
- send, to the NF consumer, a response comprising a storage transaction identifier for the ML model file stored in the ADRF entity or an ML model identifier associated with the ML model file.

4. The apparatus of claim 3, wherein the NF consumer comprises one of:
- a second NWDAF entity containing MTLF; or
- an NWDAF entity containing Analytics Logical Function (AnLF).

5. The apparatus of claim 2, wherein the response to the ML model management retrieval request further comprises an address associated with the ML model file.

6. The apparatus of claim 1, wherein the ML model associated with the ML model file was trained by the NWDAF entity containing MTLF.

7. The apparatus of claim 1, wherein the NWDAF entity containing MTLF is provided in a 5G network.

8. A non-transitory computer readable storage medium storing instructions thereon which, when executed by processor circuitry of a Network Data Analytics Function (NWDAF) entity containing Model Training Logical Function (MTLF), cause the NWDAF entity containing MTLF to:
- send, to an Analytics Data Repository Function (ADRF) entity, a machine learning (ML) model management storage request, which comprises an ML model identifier associated with an ML model file and an address for the ML model file; and
- receive, from the ADRF entity, a response to the ML model management storage request, the response comprising a result indication for ML model storage.

9. The non-transitory computer readable storage medium of claim 8, wherein the instructions when executed further cause the NWDAF entity containing MTLF to:
- send, to the ADRF entity, an ML model management retrieval request, which comprises a storage transaction identifier for an ML model file stored in the ADRF entity or an ML model identifier associated with the ML model file; and
- receive, from the ADRF entity, a response to the ML model management retrieval request, the response comprising a result indication for ML model retrieval.

10. The non-transitory computer readable storage medium of claim 9, wherein the instructions when executed further cause the NWDAF entity containing MTLF to:
- receive, from a Network Function (NF) consumer, a request for an ML model;
- send, to the NF consumer, a response comprising a storage transaction identifier for the ML model file stored in the ADRF entity or an ML model identifier associated with the ML model file.

11. The non-transitory computer readable storage medium of claim 10, wherein the NF consumer comprises one of:
- a second NWDAF entity containing MTLF; or
- an NWDAF entity containing Analytics Logical Function (AnLF).

12. The non-transitory computer readable storage medium of claim 9, wherein the response to the ML model management retrieval request further comprises an address associated with the ML model file.

13. The non-transitory computer readable storage medium of claim 8, wherein the ML model associated with the ML model file was trained by the NWDAF entity containing MTLF.

14. The non-transitory computer readable storage medium of claim 8, wherein the NWDAF entity containing MTLF is provided in a 5G network.

15. A non-transitory computer readable storage medium storing instructions thereon which, when executed by processor circuitry of an Analytics Data Repository Function (ADRF) entity, cause the ADRF entity to:
- receive, from a Network Data Analytics Function (NWDAF) entity containing Model Training Logical Function (MTLF), a machine learning (ML) model management storage request, which comprises an ML model identifier associated with an ML model file and an address for the ML model file; and
- send, to the NWDAF entity, a response to the ML model management storage request, the response comprising a result indication for ML model storage.

16. The non-transitory computer readable storage medium of claim 15, wherein the instructions when executed further cause the ADRF entity to:

receive, from the NWDAF entity, an ML model management retrieval request, which comprises a storage transaction identifier for an ML model file stored in the ADRF entity or an ML model identifier associated with the ML model file; and send, to the NWDAF entity, a response to the ML model management retrieval request, the response comprising a result indication for ML model retrieval.

17. The non-transitory computer readable storage medium of claim 16, wherein the response to the ML model management retrieval request further comprises an address associated with the ML model file.

18. The non-transitory computer readable storage medium of claim 15, wherein the ML model associated with the ML model file was trained by the NWDAF entity containing MTLF.

19. The non-transitory computer readable storage medium of claim 15, wherein the ADRF entity is provided in a 5G network.

* * * * *